United States Patent

Bond et al.

[15] 3,694,807

[45] Sept. 26, 1972

[54] CHARACTER SEGMENTATION USING PATTERN MEASUREMENTS, ERROR RESCAN AND ADAPTIVE FONT DETERMINATION

[72] Inventors: Milton F. Bond; John F. Shatford, both of Rochester, Minn.

[73] Assignee: International Business Machines Corporation, Armonk, N.Y.

[22] Filed: Aug. 12, 1971

[21] Appl. No.: 171,326

Related U.S. Application Data

[63] Continuation of Ser. No. 889,409, Dec. 31, 1969, abandoned.

[52] U.S. Cl. ........................................340/146.3 SG
[51] Int. Cl. ...............................................G06r 9/10
[58] Field of Search....................................340/146.3

[56] References Cited

UNITED STATES PATENTS

| | | | |
|---|---|---|---|
| 3,541,511 | 11/1970 | Genchi et al. | 340/146.3 |
| 3,517,387 | 6/1970 | Andrews et al. | 340/146.3 |
| 3,167,746 | 1/1965 | Reines et al. | 340/146.3 |
| 3,271,738 | 9/1966 | Kamentsky | 340/146.3 |

*Primary Examiner*—Thomas A. Robinson
*Attorney*—J. Michael Anglin, Donald F. Voss and J. Jancin, Jr.

[57] ABSTRACT

Several types of input pattern measurements are gated together to determine the point at which adjacent characters will be separated by a segmentation signal. One type of pattern is effective to segment the characters unless an inhibitory pattern has also been received. The second pattern type will segment the characters only after an initializing pattern has been received, but only if an inhibitory pattern has not been received. A third type of pattern is effective for segmentation only after the receipt of both an inhibitory pattern and a subsequent enabling pattern. The enabling pattern may also remove the effect of the inhibitory pattern upon some or all of the first two pattern types. When the pattern size exceeds a preset maximum width without having been segmented, all three pattern types are inhibited, the pattern is rescanned and segmented with a blank scan, and a forced segmentation is produced at predetermined points within the pattern. The pattern types for both segmentation and recognition purposes may be selected from a number of pattern subsets, each subset being identified with a character set in a particular font. The characters on a document are initially scanned using a general measurement set. The number of measurements belonging to a particular subset are then counted until a predetermined number of them has appeared. At this point, the measurement switch from the general set to the subset identified as the font which is being read.

25 Claims, 14 Drawing Figures

INVENTORS.

BY MILTON F. BOND
JOHN F. SHATFORD

ATTORNEY

CHARACTER SEGMENTATION USING PATTERN MEASUREMENTS, ERROR RESCAN AND ADAPTIVE FONT DETERMINATION

CROSS REFERENCE TO RELATED APPLICATIONS

The present application is a continuation of application Ser. No. 889,409 filed on Dec. 31, 1969, by Milton F. Bond and John F. Shatford, now abandoned.

BACKGROUND OF THE INVENTION

The present invention relates to the field of character-recognition systems, and pertains specifically to the separation or segmentation of adjacent characters which are touching or merged at their edges.

Most character-recognition systems are structured to recognize a single character at a time. The recognition logic of such devices generally can successfully accept only isolated complete characters. Raster type scanners present a continuous stream of information when scanning a line of characters. The recognition system must then provide some means to detect the scan which ends the previous character. This function is known as character segmentation.

Simple character-recognition systems perform segmentation by requiring the input characters be separated by blank scan. Provided this restriction is maintained, segmentation is relatively simple. However, only a few type fonts printed on standard printing devices have blank scans between each character.

The function of segmentation, then, is simply to separate touching characters in an input pattern. It is the actual breaking off of a scanned video stream or, as conventionally implemented, a search for a break in the relationship between adjacent vertical scan. Many segmentation algorithms, developed by the assignee of the present invention and also by others, use either the analog video signals themselves or digitized video from a character matrix to search for local signal correlation which are thought to be reliable indicators of character ends. As a class, scan-correlation schemes determine the correct segmentation points by looking for relationship between the current, past, and possibly future vertical scans.

Much work has been done on these correlation schemes for segmenting touching characters, but a major drawback is that a correlation algorithm sufficient to separate characters having a high degree of touching, known as hard-touching characters, also has a tendency to make invalid segmentation within single characters. Consequently, a sectioning algorithm or apparatus would be useful to allow the hard-touching segmentation algorithms to be effective only during those scans which have a relatively high probability of containing character edges.

One prior form of sectioning is based merely upon a measured character width, or "pitch" Such systems require the measurement of an average pitch in order to zone the character into regions of increasing segmentation permissiveness as the scan count progresses from the start of a character. The actual point at which touching characters are segmented is determined by enabling increasingly powerful segmentation algorithms within each zone.

SUMMARY OF THE INVENTION

It is an object of the present invention to overcome the above segmentation problems and to advance the state of the segmentation are by the use of attributes of the input pattern which have a relatively high power for segmentation, and then by gating these attributes in accordance with the present or absence of other pattern attributes in order to prevent otherwise invalid segmentation. The pattern attributes may be specific subpatterns of the input pattern, conventionally known as character "features"; they may also be indicative of pattern height or width, logical functions or correlations of adjacent scans, and other characteristics of the input pattern characters contained in the input pattern.

The segmentation algorithm of the present invention is based upon three sets of attributes of an input pattern represented by a digitized video stream as it is generated in real time and stored in a scan-storage shift register. In the particular embodiment to be described, these three attributes represent particular types of subpatterns or features, and will hereinafter be referred to as type-I, type-IIB and type-IIIC features. The appearance of each such feature produces a sectioning signal indicating that the corresponding feature has appeared in the input pattern. These signals are then gated with intermediate signals produced from additional pattern attributes, which may also be character features. More specifically, the presence of certain "inhibit" features, referred to as type-IIIA features, recognizes that certain of the type-I and or type-IIB features may produce an invalid segmentation, and accordingly inhibit the production of a segmentation signal from their associated section signals. The presence of type-IIB patterns, on the other hand, may produce invalid segmentations unless they are allowed to be effective only after an "initializing" (type-IIA) feature has been observed. Thirdly, the effect of the inhibit signal upon the applicable type-I and type-IIB features may be removed by the presence of an "enabling" (type-IIIB) feature. Finally, type-IIIC segmentation patterns are made to be effective only after the observation of both an inhibit feature and an enabling feature.

Another object of the invention is to provide a supplementary segmentation technique for use when the above patterns have failed to produce a valid segmentation. This supplementary technique is based upon the above-described sectioning by pattern-width measurement. In conventional pitch sectioning, average character widths are determined either by manual entry or by machine counting of a predetermined number of characters in an entire character line. The machine then divides the entire input field into spaces of equal width. In the present system, on the other hand, the area which is broken up into character spaces is only that area in which the pattern-segmentation algorithm has failed. This function is accomplished by the sensing of an excessive pattern width, a rescan of the area beginning with the start of the character and continuing until a natural segmentation is achieved by the sensing of a blank scan. Meanwhile, the pattern-segmentation apparatus is inhibited. Then, the area bounded by the blank scan is divided into a number of character areas by strobing a scan counter with multiple pulses during each scan. Whenever the counter reaches a preset number, a forced segmentation divides the area into a number of equal-width character spaces.

Another object of the present invention is to provide means for selecting the above-mentioned pattern features from one of a number of feature subsets. In the present embodiment, these subsets represent character fonts. Features from any or all of the above types may be selected by the font-determination algorithm. In addition, although the feature subsets have been designed primarily for use in segmentation, they may also be employed in the actual recognition process. In this apparatus, one group of attributes of the input pattern is the number of features contained therein which belong to one of a plurality of subsets of features. One of the subsets, comprising a class of general features, is initially employed for segmentation and or recognition. Meanwhile, a counter tallies the number of features observed which belong to specialized ones of the subsets. When the accumulated number of features of one such subset has reached a magnitude sufficient to identify a pattern stream as belonging to that subset, a gating means substitutes the measurements from the identified subsets for those of the general subsets.

DETAILED SYSTEM DESCRIPTION

Figure 1:
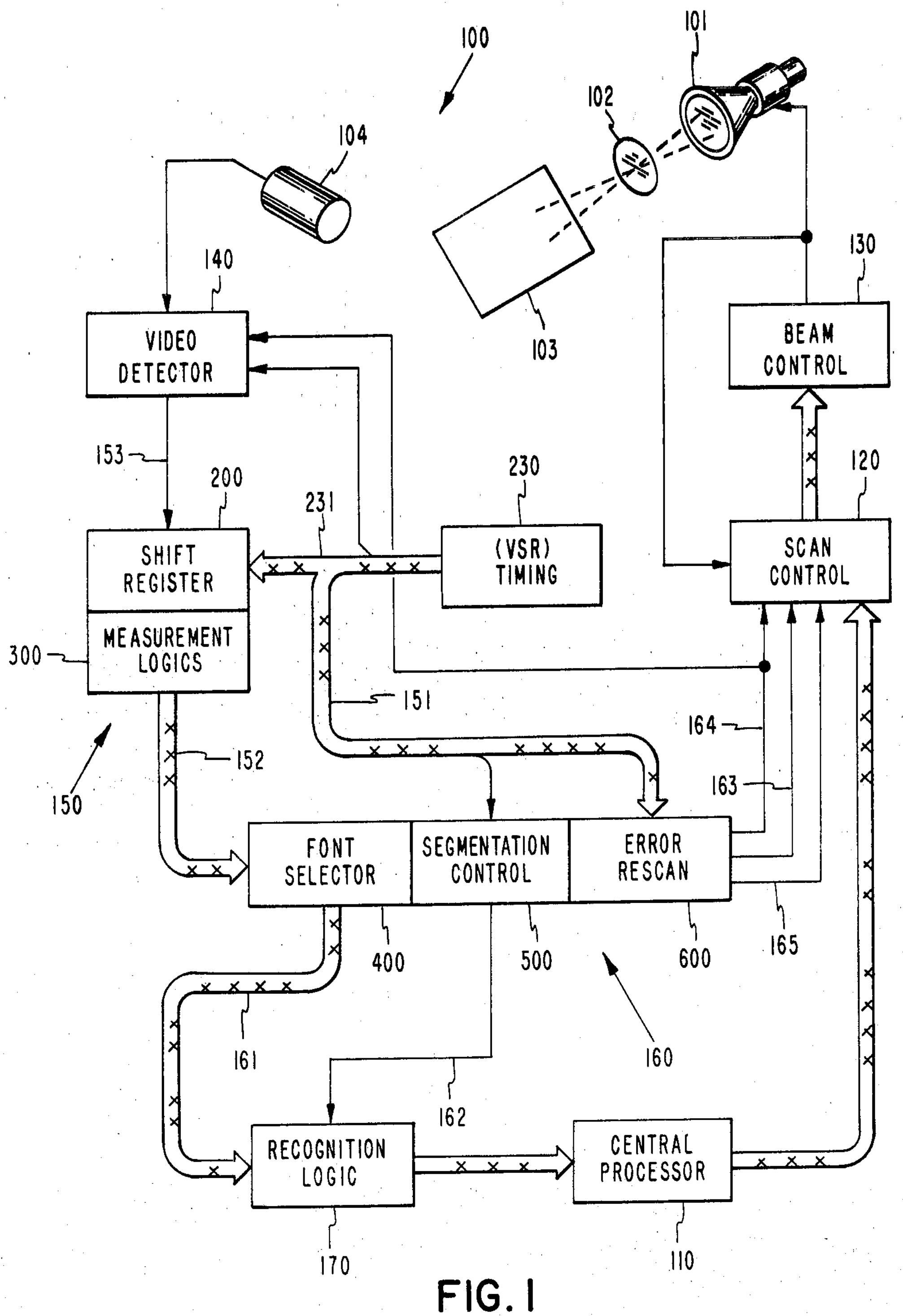
FIG. 1 is a system diagram of a character-recognition system incorporating apparatus according to the teachings of the present invention.

FIG. 1 shows the present invention in the setting of an otherwise conventional character-recognition system 100 using a flying-spot scanner 101 focused through an optical system 102 onto a document 103, from which light is reflected into photomultiplier tube 104. The operation of this system begins when central processing unit 110 issues a series of commands to scan-control unit 120 for specifying a sequence of scanning patterns. Beam-control unit 130 then causes CRT 101 to execute the desired patterns. Video detector 140 receives reflections of the light spot from document 103 through photomultiplier 104. Detector 140 applies various filtering and clipping functions to the analog video to provide a time-digitized output stream having black bits and white bits representative of the input pattern. The digitized video is received by shift register 200 of unit 150 where it is stored as an electronic image, as in conventional practice. Timing unit 230 carries various timing signals to other units for use in additional operation which must be timed.

A set of measurement logic circuits 300 then operates on the electronic image stored in register 200 to develop signals on line 152 representative of the presence of specified attributes or features of the electronic image. A font-selection unit 400 of processing apparatus 160 receives the feature signals on 152 and selects a subset of these feature signals for use in a segmentation control to unit 500. The selected subset is also transmitted over line 161 for use by recognition-logic unit 170. Control unit 500 produces a segmentation signal on line 162 for signaling recognition unit 170 when the input pattern is to be broken or segmented into character areas. Error-rescan unit 600 detects the failure of control unit 500 to produce a segmentation signal within a predetermined interval. Unit 600 then signals scan-control unit 120 over line 163 to initiate a rescan of the pattern. Line 164 may also cause video detector 140 to modify some of the parameters used in digitizing the analog video signal from photomultiplier 104. During the rescan, unit 600 causes control unit 500 to force a segmentation signal on line 162 at various points within the input pattern. Thus, as will be more fully described hereinafter, control unit 500 employs attributes of the input pattern from font selector 400 (or directly from measurement logics 300) representative of subpatterns or features of the input pattern, and also employs pattern-width signals from rescan unit 600 representative of the size of the input pattern.

Recognition unit 170 accepts various pattern features or measurements over line 161 for recognizing the input pattern by means of logical operations upon a pattern derived therefrom, the derived pattern being specified by the attribute signals on line 161 and the segmentation signal on line 162. That is, the derived pattern is here shown to be specified in at least two different ways. In one sense, the derived pattern is comprised of a combination of features signals, either received directly from measurement logics 300 or further derived as a subset of these signals by font selector 400. In another sense, the derived pattern is specified as a bounded area of the input pattern by means of segmentation signal 162. As here shown, the segmentation signal is applied directly to recognition unit 170 to select only those feature signals which were observed in the bounded area. Signal 162 may alternatively be coupled to another unit for specifying the extent of the bounded area.

Finally, the recognition cycle is completed by specifying the identity of one or more areas of the input pattern to CPU 110. Processor 110 may then take appropriate action in accordance with various techniques of conventional practice.

THE SHIFT REGISTER (FIG. 2)

The present invention may be used with any type of means for receiving an electronic image of an input pattern. The system here described employs a conventional shift register 200 for receiving the digitized video stream, either directly or after a consolidation operation, on line 152. The video bit stream is then passed sequentially through a large number of shift-register cells 201. Shifting takes place in a vertical downward direction through one column of cells, then to the top of the next column of cells and so forth. A vertical scan ring (VSR) 230 provides timing signals over line 231 for controlling the passage of the bit stream through cells. 201. Some of the VSR timing signals are also outputted to other units on line 151 for controlling the operation of other functions within the recognition system. Although shift register 200 comprises a linear chain of cells 201, it is here represented in two-dimensional form for ease in visualizing the electronic image. It is also conceptually divided into a look-ahead register 210 having six columns, LA1 through LA6, of 39 cells each, and a main register having 0) columns, MR1 through MR 20, also containing 39 cells each. Line 202 connects the last stage of the look-ahead register 210 with the first stage of the main register 220. Each shift-register column represents one vertical raster scan of the input pattern. Each such scan is divided into 39 increments, VSR1 through VSR 39, by timing means 230. Thirty-three of these increments are used for the actual scan time; the remaining six increments are used for scanner retrace time.

As the image is shifted through register 200, a number of sensing lines 203 detect the state of each cell 201 for use by the measurement logics 300. For ease in describing the various logic functions to follow, the individual cells of register 200 will be referred to by register name, column number and row number. Thus, for example, the designation of cell 211 is LA2–38, and the designation of cell 221 is MR15–35.

THE MEASUREMENT LOGICS (FIG. 3)

The sensed state of the shift register cells is applied to a group 300 of measurement or feature logic circuits 310–380 via lines 203. Each logic unit 310–380 in turn contains a number of feature-logic circuits, each providing an output signal, such as 311–313, 321–323, etc., indicative of the presence of predetermined combinations of states of the register cells 201. Line 301 then transmits individual signals to font-selection unit 400. The measurement logics have been arbitrarily divided into eight types for clarity in the description to follow. Representative examples of each type are shown in Figures 3A–3H.

Figures 2, 3:
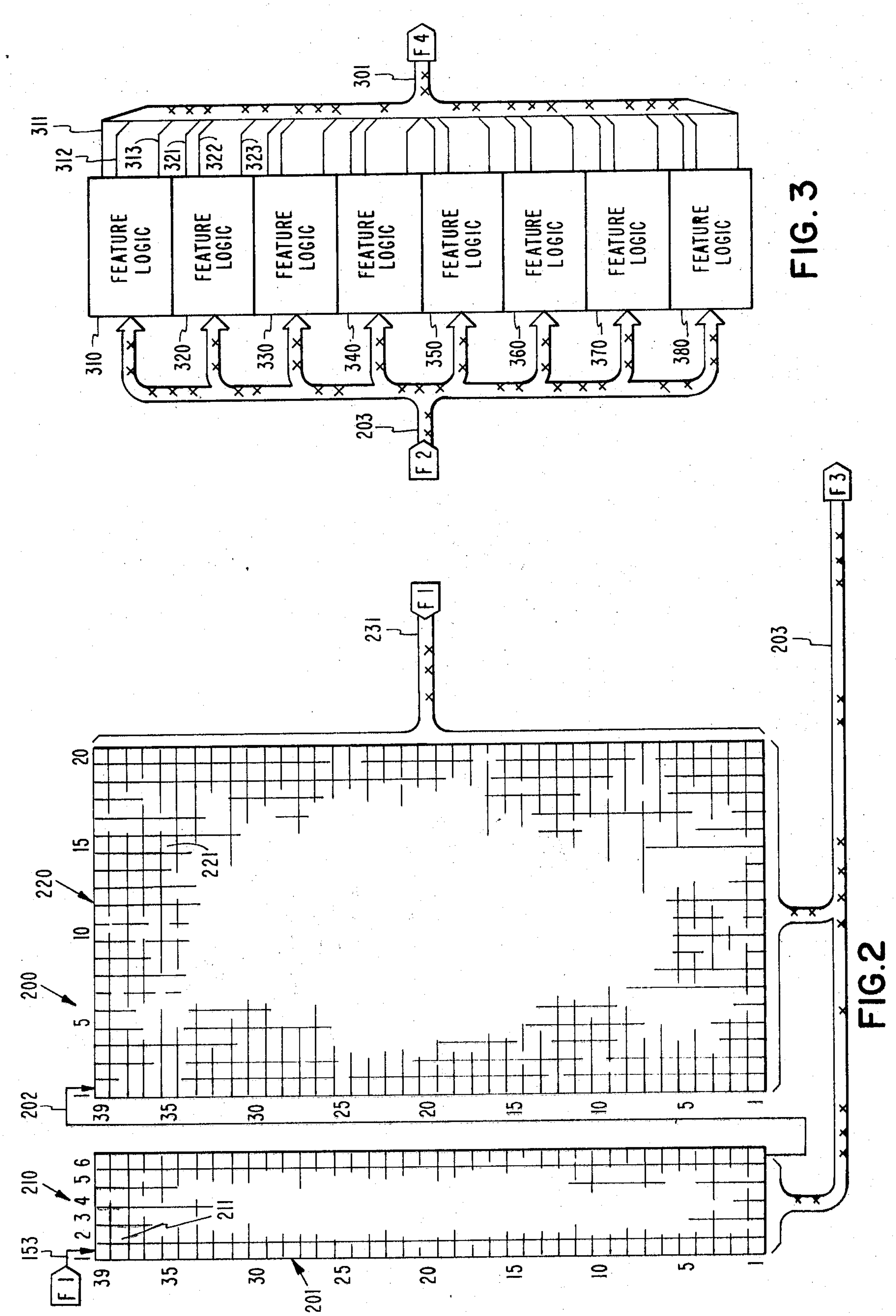
FIG. 2 is a stylized representation of a pattern-storage and timing means for use with the invention.
FIG. 3 shows a number of measurement logics for producing outputs in accordance with logical functions, representative examples of which are illustrated graphically in FIG. 3A–3H.
Figure 3C:
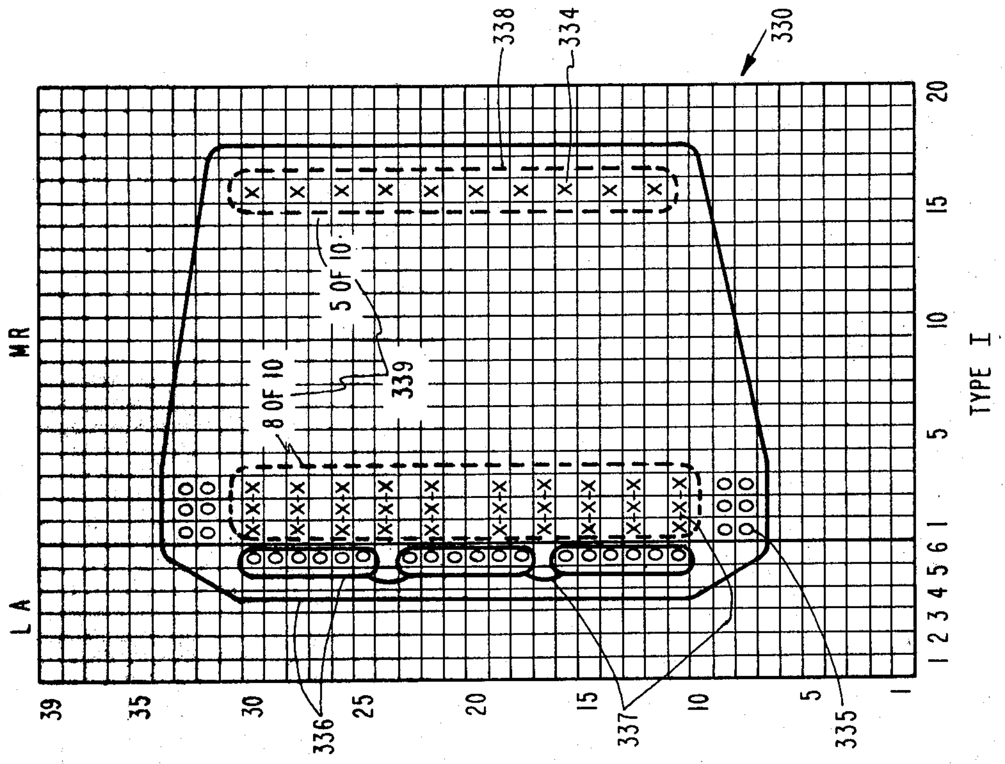
Figure 3B:
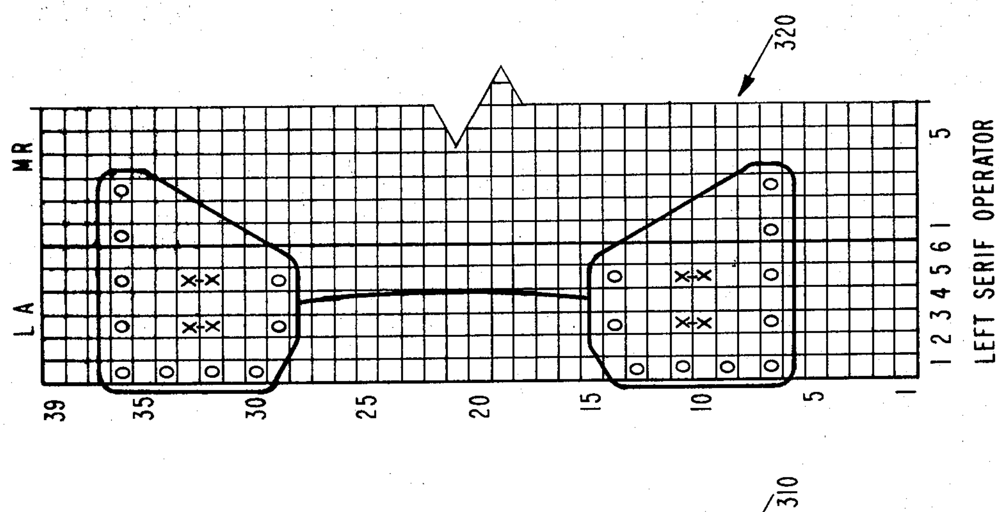
Figure 3A:
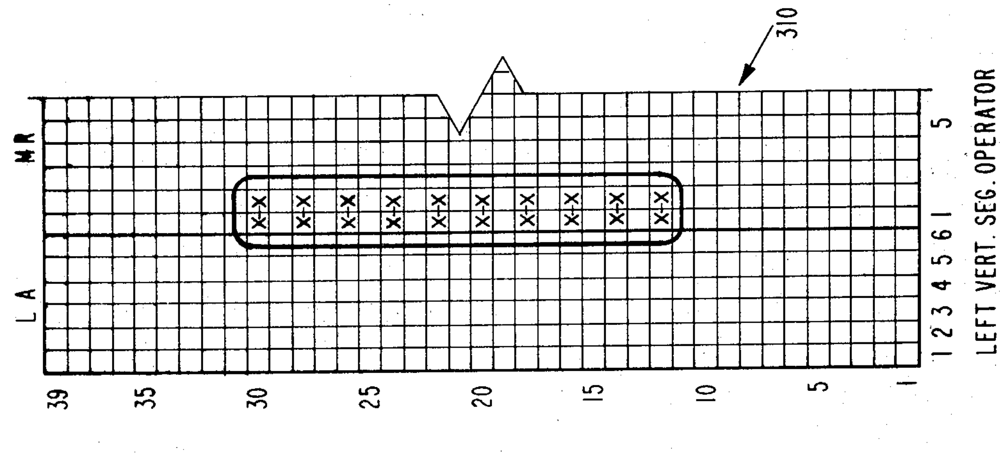
Figure 3E:
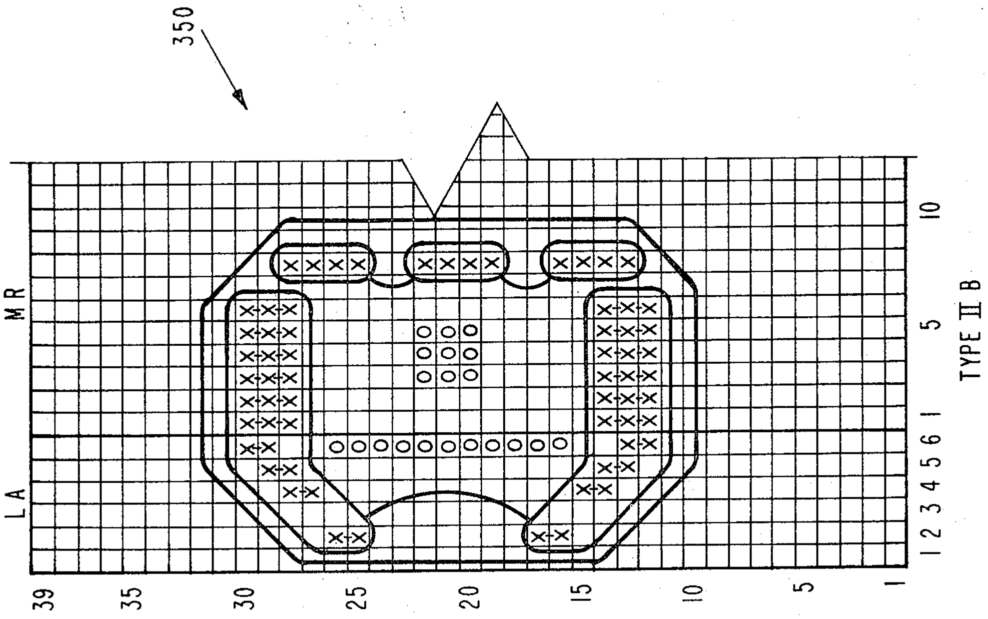
Figure 3D:
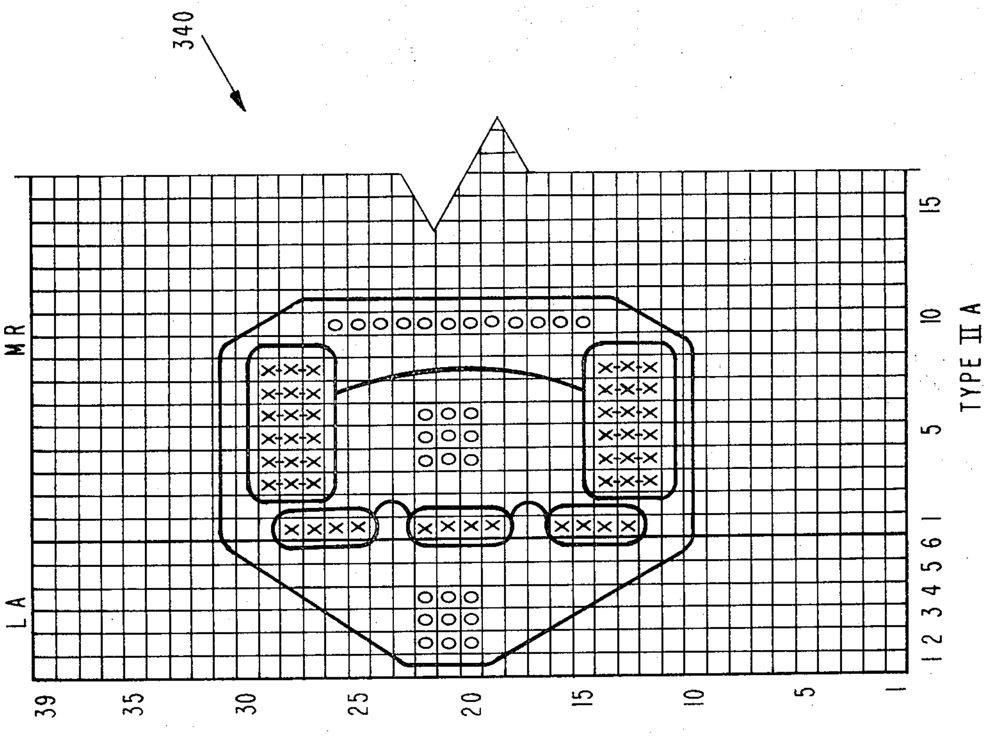
Figure 3H:
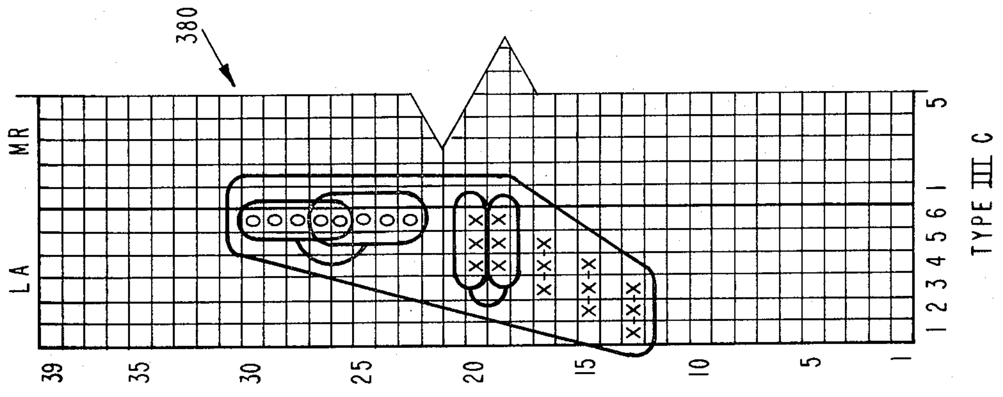

Rather than showing the hardware for implementing each logic function, FIGS. 3A,–3H display the functions graphically on a grid using the number coding of FIG. 2. A scheme for coding the logic functions is as follows. An X such as 334 in cell MR16–20 of FIG. 3C, signifies that this cell must be in a "ONE," or "black" state in order to satisfy the logic function. An 0 in a cell such as 335 (MR1–8) indicates that that cell must be in a "ZERO" ("white") state in order to satisfy the function. A heavy line such as 336, drawn around a group of cells or a combination of such groups, indicate an "AND" of the enclosed cells or groups. A line such as line 337 drawn between cells or groups of cells indicates a logical "OR" of the designated cells or groups. A heavy dashed line 338 drawn around a group of cells or a combination of such groups, signifies a threshold function of these groups or combinations; the number of such groups or combinations is shown in each case by a legend 339.

The implementation of the logic functions shown in FIG. 3A–3H may be performed in a routine manner from the above descriptions. The particular logic function used of course will depend upon the pattern type to be recognized. The specific design is largely empirical, and is carried out either manually or by machine analysis of large samples of input pattern. The specific feature type and purpose of each of these functions will be explained in connection with FIGS. 4 and 5.

THE FRONT SELECTOR (FIG. 4)

The purpose of font-selection unit 400 is to receive the set of all features signals on line 301 as an input pattern, to divide them up into a number of classes or subsets, and to measure a number of attributes of the signals in each class. In this instance, the measured attributes primarily comprise the number of occurrences of features within each subset, rather than sensing the occurrence of specific features as such. In addition, however, a small number of specific features are employed in the font-selection process. Signals representing occurrences of specific types of features are then decoded and used to produce or inhibit a plurality of control signals, which in turn are employed to select only one category of the feature signals for transmission to the recognition unit 170 over line 405. That is, in this case, the input pattern is represented by the totality of feature signals on lines 301, and the output pattern on lines 405 represents a pattern derived therefrom by selecting a particular category for a subset of the input feature signals.

In order to simplify the description, font selector 400 is shown as choosing only between a general set of features on line 402, features representative of serif characters on line 404 and features representative of sans-serif on line 403. Within a receiving means 410, OR gate 411 sends an output to AND 421 upon the occurrence of any serif feature appearing on line 404. Another input to AND 421 is supplied by latch 412, which is set by the "left vertical segmentation" operator (LVSEG.), as specified in FIG. 3A. As may be seen from FIG. 3A, this logic function looks for a vertical line at the left side of a character. Latch 412 is reset after each character by a "segmentation delayed" (SEG.DLY.) signal from FIG. 5. The SET output of latch 412 also enables AND 413 to set a latch 414 upon the occurrence of a "left serif" operator (L.SER.). This operator, displayed in FIG. 3B, is satisfied by the occurrence of a serif either at the top of the bottom of the left side of a character. The satisfaction of AND 413 then indicates that the character belongs to a serif font by energizing the SET output of latch 414. If, on the other hand, no serif has been observed, the ZERO output of latch 414 enables AND gate 422. AND 422, which also requires the presence of LV SEG., then produces an output whenever a feature belonging specifically to a sans-serif font is observed.

The reception of the proper serif features by the unit 410 is then measured in a reversible counter 423 of measuring means 420. Counter 423 is strobed by the SEG. DLY. signal on line 509 from FIG. 5, so that the counter is incremented once for every character scanned. The predominance of serif characters is signified by a positive magnitude in counter 423; accordingly, the satisfaction of AND 421 causes the counter to count in an upward direction. Correspondingly, a satisfaction of AND 422 causes counter 423 to count in a downward direction in order to signify the predominance of sans-serif characters. The outputs of inverters 424 and 425 serve only an auxiliary purpose, as will be explained. The reset input to counter 423 merely allows a fresh start to be made on, for instance, each new batch of documents to be read.

Signals representing the contents of counter 423 are then transmitted over line 426 to a selection means 430, where they are interpreted as gating signals.

The purpose of selecting unit 430 is to choose among the three subsets of feature signals 402–404 in accordance with specified predominances of serif or sans-serif characters. Decoder 431 accepts the contents of counter 423 on line 426. A bit pattern representing a predetermined positive count N = +M is effective to convert this bit pattern into a control signal for selecting the serif font for segmentation purposes. The presence of another bit pattern N = −X is effective to produce a second control signal 433 for selecting a sans-serif font. Bit patterns on line 426 other than these two are effective to inhibit the gating of control signals 433 and 432; in addition, these other patterns are effective to select a general measurement set via line 434. The presence of control signal 432 is also passed through inverter 424 in order to disable AND gate 421. If AND 421 were not disabled in this manner, the receipt of further serif character features would continue to cycle counter 423 and thereby destroy control signal 432. But, on the other hand, the presence of signal 432 has no effect upon AND 422, so that the receipt of a sufficient number of sans-serif character features is still operative to block signal 432 and to substitute either signal 433 or 434, despite the previous selection of the serif font. Control signal 433 operates upon AND 422 through inverter 425 in a similar manner, mutatis mutandis. After the signals 432–434 have been gated out of decoder 431, the actual selection among the subsets 402–404 is accomplished by a logical switch, comprising AND gates 435–437 and OR gate 438, to produce the derived feature-subsets on line 405.

THE SEGMENTATION CONTROL (FIG. 5)

Segmentation control unit 500 receives the selected subsets of features signals on line 405 and further divides this subset into a plurality of pattern types to be used for several segmentation purposes. Several features signals, labeled "type I," are entered into a first gating means 510 by the setting of latches 511 and 512. The observation of these patterns is recorded as the presence of sectioning signals on lines 513 and 514 respectively. Any one of these section signals is effective to produce a segmentation signal at the SET output of latch 518 through OR 517, unless it has been blocked by an inhibit signal on line 534. Gating means 510 may of course be configured to accept an inhibit signal of either logical polarity for blocking the section signals 513 and 514; in the present implementation the hardware is simplified if a logical ZERO signal on line 534 is used to block AND gates 515 and 516 when an inhibit pattern has been received.

One form of a type-I pattern, which may be used, for instance, in producing section signals 513, is the conventional "blank scan" This function merely senses the presence of white video bits simultaneously in every cell of one column of look-ahead register 210. Another form of type-I pattern, for producing section signals 514, is illustrated in FIG. 3C. For simplicity, only these two type-I patterns are described; many more may of course be added by providing further latches and AND gates as inputs to OR 517. Additionally, it may also be desirable to provide some type-I patterns which are not affected by inhibit signal 534. That is, these additional patterns would operate according to conventional segmentation practice.

Another category of patterns, collectively designated as "type-II," patterns, are transmitted from lines 405 into a second gating means 520. For this type of pattern, it is desirable that segmentation not take place upon the occurrence of a type-IIB pattern unless a type-IIA "initializing" feature is also observed within the character. Empirically designed examples of such patterns are shown in FIGS. 3D and 3E. The appearance of an initializing pattern (type-IIa) is recorded as an initializing signal on line 523. The occurrence of a type-IIB pattern produces a second type of section signal 524 from latch 522. The appearance of both these patterns within one character is signaled by AND 525. Several sets of initializing and sectioning patterns may of course be provided merely by duplicating the components 521, 522 and 525, and feeding there individual outputs into an OR gage (not shown). In addition, it is obvious that several type-IIB patterns may have a single type-IIA initializing pattern in common, and that a single type-IIB pattern may be made to be effective upon the occurrence of any one or more of several type-IIA patterns.

The output of AND 525 is next transmitted to AND 526 in order to block an otherwise effective section signal by the use of the inhibit signal on line 534. As mentioned above, the presence of an inhibiting pattern is signaled by a logical ZERO on line 534. Again, as described in connection with gating means 510, some combinations of type-IIA and -IIB patterns may be made nonresponsive to the inhibit signal 534. Moreover, more than one inhibit signal may be employed to block various combinations of the type-II patters by the use of a logical switch (not shown) in connection with AND 526, similar to the switch 515–517 of gating means 510. Finally, gating means 520 contains a latch 527 for recording the presence of the proper combination of signals on lines 523, 524 and 534.

A third gating means 530 provides yet another combination of signals for segmentation of the input pattern. In this gating means, latch 531 receives a type-IIIA inhibiting pattern at a SET input to provide the aforementioned logical-ZERO signal on line 534. Latch 532 also receives the type-IIIA signal at its SET input in order to record the fact that this pattern has been observed within the bounded area representing the current character. Another latch 533 receives a type-IIIB enabling pattern, whose presence signifies that the type-IIIA pattern should no longer be effective to block the sectioning signal on lines 513, 514 and 524. Accordingly, the appearance of a type-IIIB pattern resets latch 531 so as to remove the logical ZERO signal from line 534.

Figure 3G:
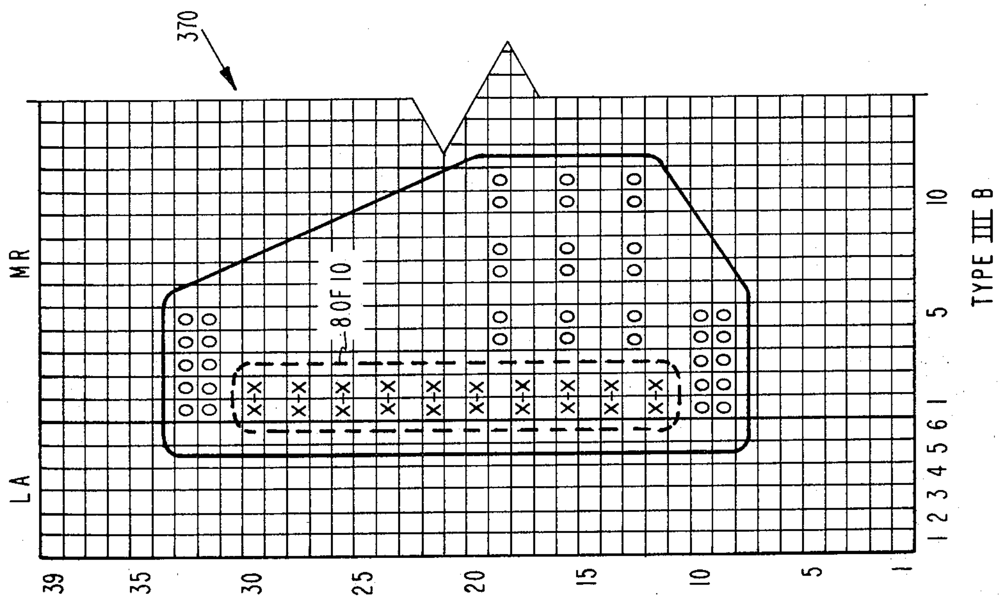
Figure 3F:
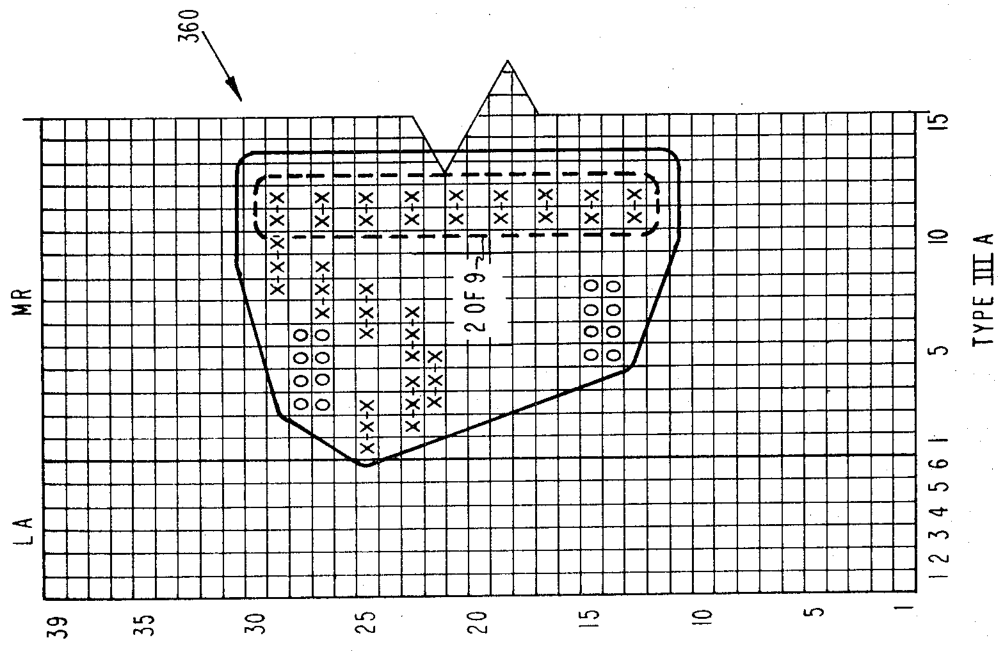
Figure 4:
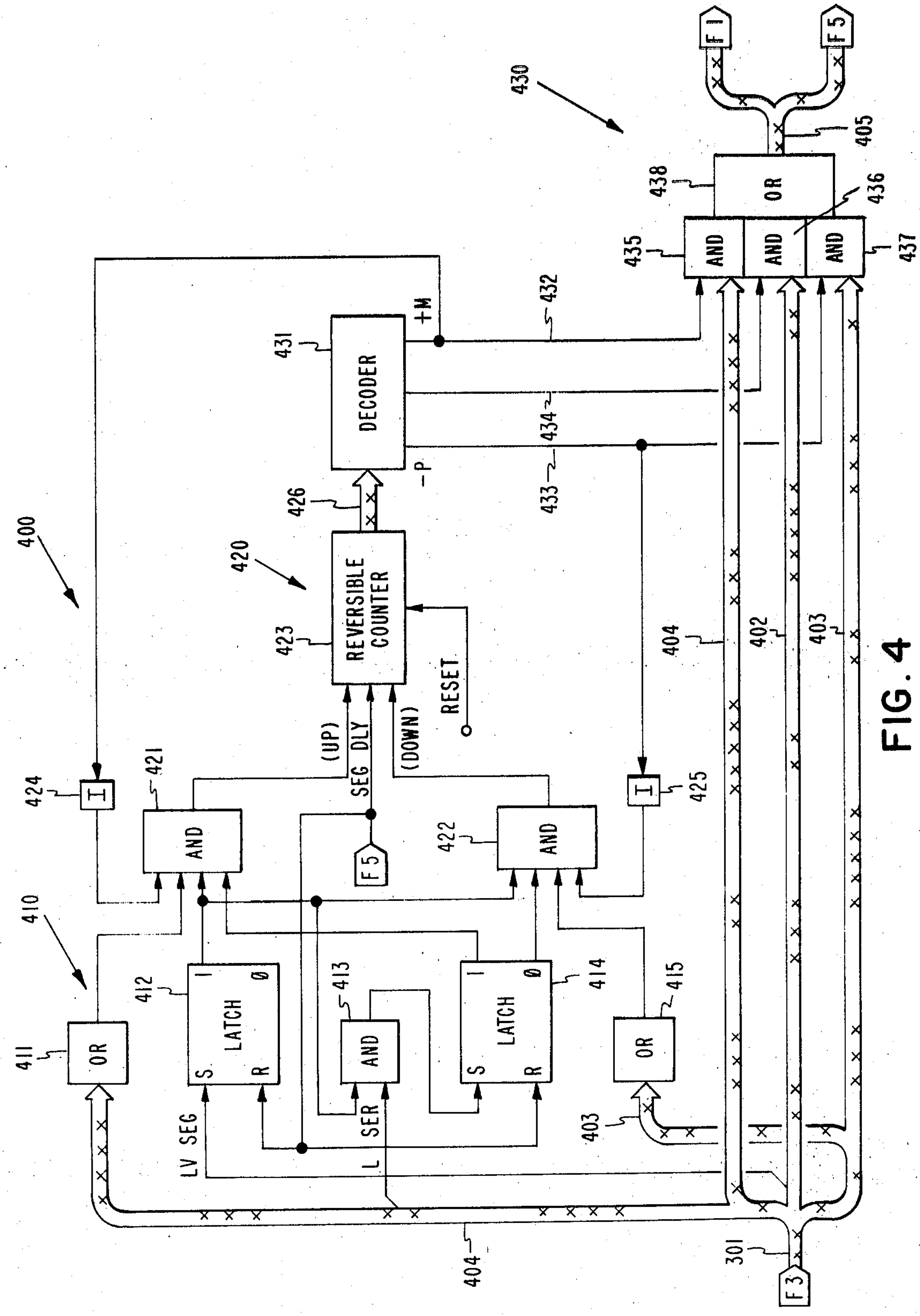
FIG. 4 illustrates a font-selection control unit used in the invention.

Additionally, line 535 and 536 condition AND 538. The presence of a logical ONE on both of these lines then indicates that both the inhibit (type-III) and the enable (type-IIIB) patterns have been observed during the current character. Then, the subsequent receipt of a type-IIIC pattern, producing a third sectioning signal on line 537, enables AND 538 to set latch 539, whose SET output represents a segmentation signal. Note that sectioning signal 537 is not latched, so that it is effective only if received at a later point in time than the signals on line 535 and 536. Again, as in the gating means 510 and 520, the components of gating means 530 may be duplicated to provide a number of inhibit, enable and sectioning signals for use in various permutations and combinations. Examples of type-IIIA, -IIIB and -IIIC patterns are illustrated in FIGURES 3F–3H, respectively.

Figure 5:
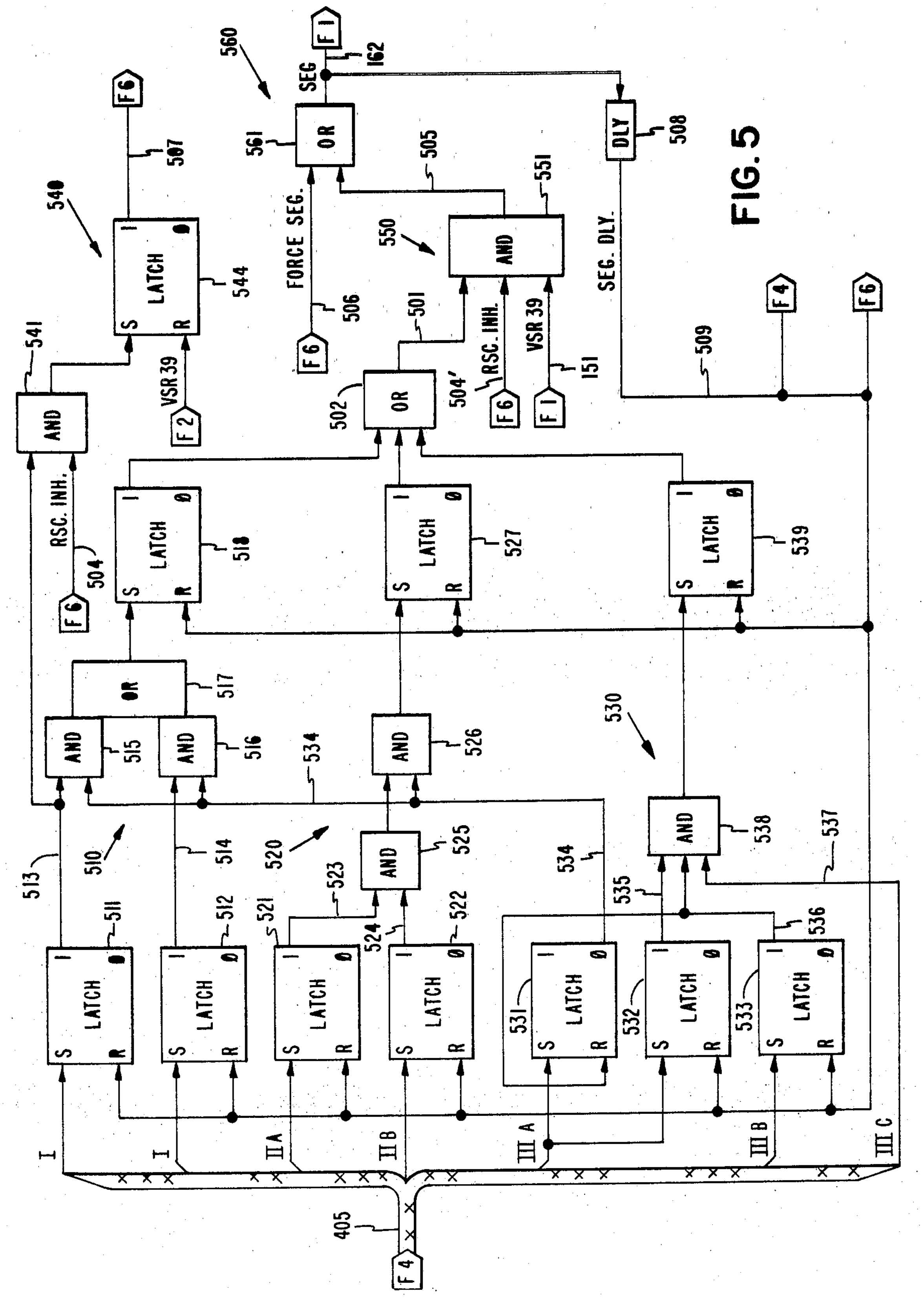
FIG. 5 depicits a segmentation control unit for the invention.
Figure 6:
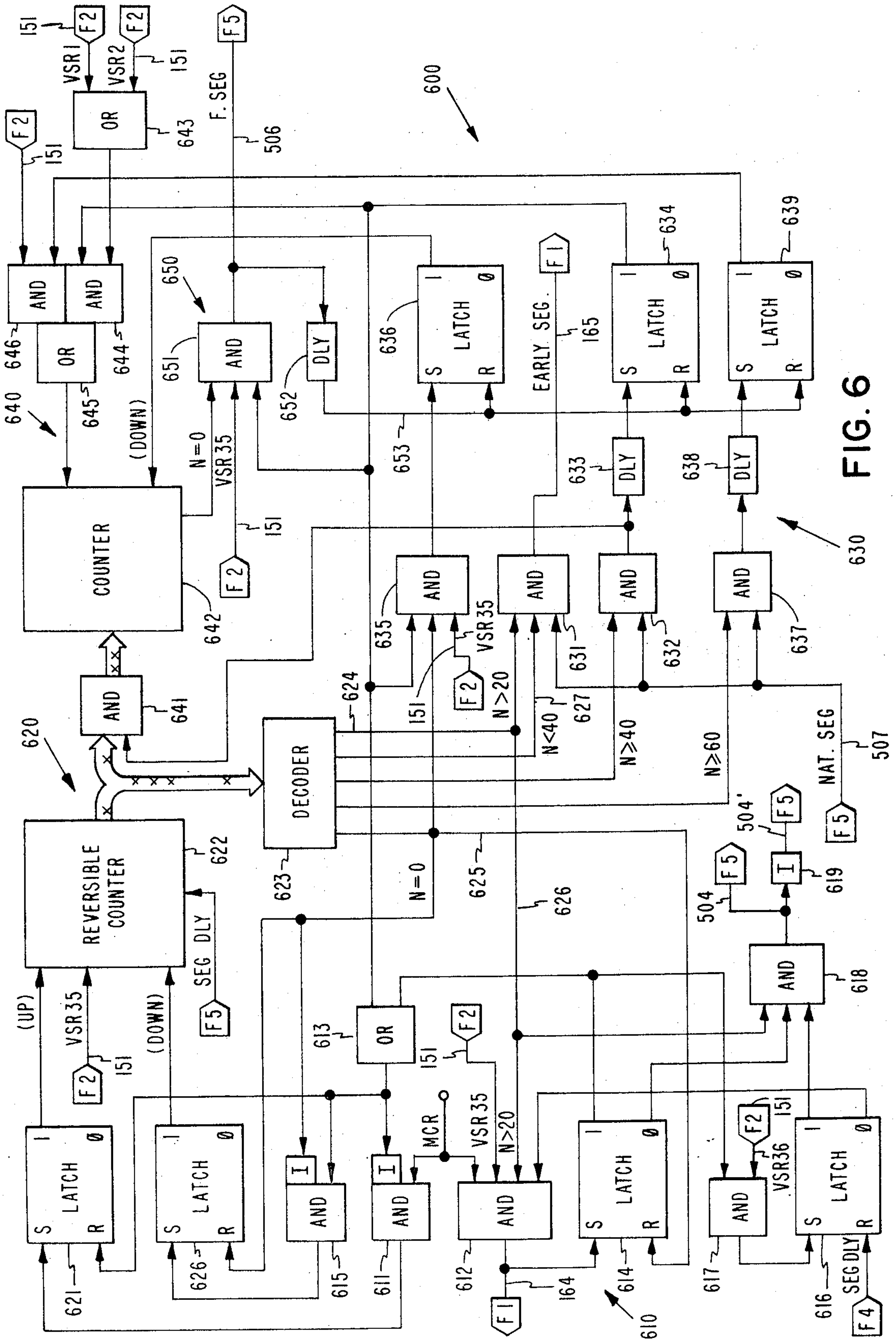
FIG. 6 shows a rescan control unit for the invention.

In the portion of FIG. 5 thus far described, the satisfaction of any of the gating means 510–530, as represented by SET outputs of latches 518, 527 and 539, would be effective to produce a segmentation signal on line 501 via OR 561. It is also possible, however, to provide multiple levels of gating employing further gating means similar to those designated 510–530.

Gating means 540 illustrates such a function and also shows the use of input-pattern attributes other than specific geometric features or subpatterns thereof. Gating means 540 receives a sectioning signal indicating a "blank scan" type-I pattern over line 513 to condition AND 541. Then, if a "rescan inhibit" signal is present, line 542 will set latch 544 to produce a sectioning signal on line 507 for use by error-rescan unit 600 in producing a segmentation signal on line 506. Therefore, gate 540 represents a gate similar to that of 520, but wherein the gating signal denotes that the error-rescan unit 600 is in an ON condition, which in turn signifies that the input pattern is larger than a predetermined width. That is, the signal on line 542 represents a pattern size, rather than a character subpattern as does the signal 534.

Gating means 540 has no direct effect upon the segmentation signals produced by gating means 510–530. Gating means 550, on the other hand considers the segmentation signal on line 501 to be yet another type of sectioning signal, to be operated upon by further attributes of the input pattern. More specifically, the signal on line 501 is effective to produce a segmentation signal on line 505 only if the inverted rescan-inhibit signal on line 504' is present. The VSR39 signal on line 151 is merely a timing means to permit segmentation only during scanner retrace time.

Now, a further gating means 560, comprising OR gate 561, is effective to produce a segmentation signal on line 162 regardless of the presence of the rescan-inhibit signal on line 504' if a "forced segmentation" signal is present on line 506. This signal is produced by rescan unit 600 and is based upon the width of the input pattern.

Lastly, the segmentation signal on line 162 is delayed by delay unit 508 so as to produce a "signal delayed" signal on line 509. This signal is used to reset a number of latches in the units 400–600 at the end of each character area.

THE ERROR-RESCAN UNIT (FIG. 6)

Broadly stated, the purpose of rescan-control unit 600 is to receive data representing the width of the scanner input pattern and to divide this width into categories or ranges each representing an attribute of the input pattern. These functions are accomplished by mode-control unit 610 and scan-counting unit 620. An intermediate gating unit 630 then produces a plurality of intermediate and inhibit signals. A selecting means, including unit 630, a segmentation counting unit 640 and an output gating unit 650, co-act to produce a control signal on line 506. This signal, designated a "forced segmentation" (F.SEG.) signal, operates upon recognition unit 170 via OR 561 and line 162 to determine a character boundary within the input pattern.

The operation of the error-rescan apparatus 600 begins with the receipt of a "minimum character requirement" (MCR) signal by AND 611 and AND 612. MCR is a conventional measurement obtained from shift register 200. It is satisfied when a predetermined minimum number of bits in the shift register are black, thereby denoting that the shift register contains more than merely a noise blob, or bark mark. Then, since the apparatus is in neither its Rescan-1 nor its Rescan-2 mode, the output of OR 613 is a logical ZERO, thus enabling AND 611 to pass a signal to the SET input of latch 621 of scan-counting unit 620. The SET output of latch 621 indicates that the scanner is on a character and is not in either of its rescan modes. Under these conditions, counter 622 is conditioned to be incremented in an upward direction once per scan. The strobe signal VSR35 for counter 622 is obtained from timing means 230 via line 151.

If segmentation-control unit 500 produces a segmentation signal within a nominal 20 scans of the previous segmentation signal, SEG.DLY. on line 509 resets counter 622, and rescan unit 600 takes no further action during that character. If, on the other hand, a scan count of 20 is exceeded, output 624 of decoder 623 conditions AND 612. Then, since MCR has been satisfied, the next VSR35 pulse will enable AND 612 to transmit a pulse on line 164 indicating that the character has an excessive width and is to be rescanned. This rescan mode, designed "Rescan-1," also sets a latch 614, which in turn disables counter 622 from counting in an upward direction by resetting latch 621 through OR 613. OR 613 concurrently disables AND 611 and conditions AND 615. Then, since counter 622 holds a non-zero count, the ZERO state of output enables AND 615, through an inverted input, to set latch 626 to condition counter 622 to increment in a downward direction upon being strobed by line 151. Meanwhile, line 164 causes scan control 120 to increment the scanner backwards to the last segmentation point. Line 164 also modifies the threshold parameters of video detector 140, as previously described. Meanwhile, the SET output of latch 614 has set inhibit latch 616 through AND 617, which had been enabled by VSR36 on line 151. When the output 625 of decoder 623 has indicated that the scanner has reached the beginning of the character, Rescan-1 latch 614 is reset, and scan-control unit 120 commences another scan through the pattern. This scan is exactly like the normal scan through the pattern, except that the video parameters have been modified. Segmentation control unit 500 operates in the same manner as previously described. Scan-counting unit 610 also operates exactly as it had during the previous scan.

If, however, counter 622 again passes a count of 20 scans, the SET state of inhibit latch 616 prevents the enabling of AND 612. Then as rescanning is continued, the SET state of latch 616, coupled with the reset state of latch 614 and the output 626 of decoder 623 enables AND 618 to define a Rescan-2 mode. At this point, then, segmentation unit 500 has not found a valid segmentation point during the first 20 scans of the character in a rescan mode. The activation of AND 618 then produces two polarities of a "rescan inhibit"

(RSC.INH.) signal on lines 504 and 504' which inhibits any patterntsegmentation signal on line 501 as previously described. The only segmentation scheme now effective is the natural segmentation (NUT.SEG.) or blank-scan technique on line 507. The sectioning signal on line 507, however, does not of itself effect a segmentation of the pattern. Rather, it acts as an intermediate signal for the intermediate gating unit 630 to control a forced segmentation algorithm when the scan count exceeds 40. If a blank scan is reached before a count of 40, an "early segmentation" segmentation signal is produced on line 165 by AND 631. Since this condition indicates that an invalid segmentation has taken place at an earlier point, line 165 causes scan control 120 to rescan the entire line. But a blank scan occurring after a count of 40 enables AND 632, which enables AND 641 to dump the contents of counter 622, at the point of the blank scan, into counter 642. After passing through delay 633, it also sets latch 634.

Line 507 also causes scan control unit 120 to return to the beginning of the character, via a signal on line 163. This scan return occurs in the same fashion as that described above for the Rescan-1 mode since OR 613 is satisfied by the SET state of latch 634. Then latch 634 conditions AND 635 to set latch 636 at the next VSR35 signal on line 151, since the N=0 output 625 of decoder 623 is active when the scan return is complete. Now, since counter 642 is conditioned to count downwardly, by Rescan-2 latch 634, two timing signals per scan (i.e., VSR1 and VSR2) are permitted to strobe counter 642 through OR 643, AND 644 and OR 645. If, in addition, the scan count had exceeded 60, indicating a triple-width character, AND 637 would pass a signal through delay 638 to set latch 639. The SET condition of latch 639 then allows an additional timing pulse, VSR3, to strobe counter 642 during each scan, through AND 646 and OR 645.

When the counter 642 has reached a ZERO count, line 648 conditions AND 651 of output gating unit 650. Then, during the next VSR35 signal on line 151, AND 651 is enabled, since latch 634 is in its SET state. AND 651 then produces the aforementioned forced-segmentation control signal on line 506. Additionally, delay 652 produces a reset signal on line 653 for resetting latches 634, 635 and 639. The forced-segmentation signal terminates the operating cycle of rescan unit 600. If the character was triple-width, the double-width character remaining after the forced segmentation will be scanned with a normal scan routine as hereinabove described. If this normal scan fails to separate the characters, unit 600 will again be activated. Although additional hardware could be included to handle triple-width characters in one pass, experience has shown that only 0.01 percent of all characters are triple-width or greater in the Rescan-2 mode. The benefits to be gained by single-pass segmentation in this case are therefore not worth the added expense and complexity. The illustrated system handles double-width and triple-width characters. Characters of greater width could be handled merely by adding additional outputs to decoder 523 and additional gating means such as components 636, 638 and 639. Alternatively, the detection of quadruple-width characters could be made to reject the entire line.

We claim:

1. A pattern-recognition system, comprising:

means for scanning data representing an input pattern;
first measuring means responsive to said data for producing a set of signals each representing an attribute of said input pattern;
second measuring means responsive to a plurality of said signals for accumulating the occurrences of specified ones of said attributes;
third measuring means responsive to said scanning means for producing a signal indicative of the size of said input pattern;
first gating means responsive to a first threshold magnitude accumulated in said second measuring means for selecting a subset of said attribute signals;
second gating means responsive to at least on signal in said subset of attribute signals for producing a first segmentation signal upon the occurrence of a predetermined combination of said first and second signals;
means responsive to a second threshold magnitude of said pattern-size signal for re-entering said input pattern;
third gating means responsive to said size signal after re-entry of said pattern for producing a second segmentation signal when said size signal attains a third predetermined threshold magnitude; and
classifying means responsive to a plurality of said attribute signals and to said segmentation signals for recognizing said input pattern.

2. A pattern-recognition system, comprising:
means for scanning data representing an input pattern;
first measuring means responsive to said data for producing a set of signals each representing a subpattern of said input pattern;
second measuring means responsive to a plurality of said signals for accumulating the occurrences of specified ones of said subpatterns;
first gating means responsive to a first threshold magnitude accumulated in said second measuring means for selecting a subset of said subpattern signals and for inhibiting at least one other subset of said signals;
second gating means responsive to first and second signals in said subset for producing a segmentation signal upon the occurrence of a predetermined combination of said first and second signals; and
classifying means responsive to a plurality of said subpattern signals and to said segmentation signal for recognizing said input pattern.

3. A pattern-recognition system, comprising:
means for scanning data representing an input pattern;
first measuring means responsive to said data for producing a set of signals each representing a feature of said input pattern;
second measuring means responsive to said scanning means for producing a signal indicative of the width of said input pattern;
first gating means responsive to at least one of said feature signals for producing a first segmentation signal at a first point in said input pattern;
means responsive to a first threshold magnitude of said pattern-width signal for re-entering said input pattern into at least one of said measuring means;

second gating means responsive to at least said width signal after re-entry of said pattern for producing a second segmentation signal at a second point in said pattern; and classifying means responsive to a plurality of said feature signals and to at least one of said segmentation signals for recognizing said input pattern.

4. In a pattern-recognition system, apparatus for producing a segmentation signal for defining a bounded area of an input pattern, said apparatus comprising:

scanning means for producing a plurality of data bits representing said input pattern;

a plurality of feature-logic means for producing a plurality of separate feature signals, each said feature signal being responsive to the occurrence of a different predetermined combination of said data bits in said input pattern;

segmentation control means for producing a section signal in response to the presence of one of said feature signals, said section indicating a possible segmentation point in said pattern, and for producing an inhibit signal in response to another of said feature signals, said inhibit signal indicating that said segmentation point is incorrect, said control means being further operative to produce said segmentation signal in response to the concurrent presence of said section signal and absence of said inhibit signal.

5. A system according to claim 4, wherein said segmentation control means is also operative to produce an enable signal in response to the presence of one of said feature signals, said control means being further operative to block said inhibit signal in response to the presence of said enable signal.

6. A system according to claim 5, wherein said segmentation control means is also operative to produce an initialize signal in response to the presence of one of said feature signals, and to produce a second-type section signal from another of said feature signals, said control means being further operative to produce said segmentation signal in response to the concurrent presence of said initialize signal and said second-type section signal.

7. A system according to claim 6, wherein said segmentation control unit is further operative to block said segmentation signal in response to the concurrent presence of said initialize signal, said second-type section signal, and said inhibit signal.

8. A system according to claim 5, wherein said segmentation control unit is also operative to produce a third-type section signal in response to the presence of one of said feature signals, said control unit being further operative to produce an indication of the sequential occurrence of said inhibit signal and said enable signal, and to produce said segmentation signal in response to the concurrent presence of said indication and said third-type section signal.

9. A system according to claim 8, wherein said segmentation control means is also operative to produce an enable signal in response to the presence of one of said feature signals, said control means being further operative to block said inhibit signal in response to the presence of said enable signal.

10. A system according to claim 4, wherein said section signal is a second-type section signal, and wherein said segmentation control means is also operative to produce an initialize signal in response to the presence of one of said feature signals, said segmentation control unit being further operative to produce said segmentation signal in response to the concurrent presence of said initialize signal, the presence of said second-type section signal, and the absence of said inhibit signal, and to block said segmentation signal in response to the presence of said inhibit signal.

11. A system according to claim 10, wherein said segmentation control means is also operative to produce a first-type section signal in response to the presence of one of said feature signals, said segmentation control means being further operative to produce said segmentation signal in response to the concurrent presence of said first-type section signal and the absence of said inhibit signal, and to block said segmentation signal in response to the presence of said inhibit signal.

12. A system according to claim 10, wherein said segmentation control means is also operative to produce an enable signal in response to the presence of one of said feature signals, said control means being further operative to block said inhibit signal in response to the presence of said enable signal.

13. A system according to claim 12, wherein said segmentation control means is also operative to produce a third-type section signal in response to the presence of one of said feature signals, said control unit being further operative to produce an indication of the sequential concurrence of said inhibit signal and said enable signal, and to produce said segmentation signal in response to the concurrent presence of said indication and said third-type section signal.

14. A system according to claim 4, wherein said section signal is a third-type section signal, and wherein said segmentation control means is also operative to produce an enable signal in response to the presence of one of said feature signals, said control means being further operative to produce an indication of the sequential occurrence of said inhibit signal and said enable signal, and to produce said segmentation signal in response to the concurrent presence of said indication and said third-type section signal.

15. In a pattern-recognition system, apparatus for producing at least two front-selection signals for defining a subset of a set of features from an input pattern, said apparatus comprising:

means for scanning data representing an input pattern;

measuring means responsive to said data for producing a set of signals each representing a subpattern of said input pattern, said set of signals being divided into at least first, second and third subsets each indicative of subpatterns respectively belonging to first, second and third groups of input patterns to be recognized;

accumulating means responsive to a plurality of signals from said first and second subsets for storing a magnitude indicative of the relative number of occurrences of said signals from each of said subsets;

decoding means responsive to first and second threshold magnitudes stored in said accumulating means, for producing respectively a first and a second of said font-selection signals; and gating means responsive to said first font-selection signal for passing the signals of said first subset and for inhibiting the signals of said second subset, said gating means also being responsive to said second font-selection signal for passing the signals of said second subset and for inhibiting the signals of said first subset, said gating means being further responsive to the absence of both said font-selection signals for passing the signals of said third subset and for inhibiting the signals of said first and second subsets.

16. A system according to claim 15 for producing at least three font-selection signals, wherein:

said decoding means is further responsive to stored magnitudes intermediate said first and second threshold magnitudes for producing a third font-selection signal; and said gating means is further responsive to said third font-selection signal for inhibiting the signals of both said first and second subsets and for passing the signals of said third subset.

17. A system according to claim 15, wherein said accumulating means includes:

counting means adapted to be incremented at a predetermined rate;

first conditioning means responsive to signals in said first subset for causing said counter to be advanced in a first direction; and second conditioning means responsive signals in said second subset for causing said counter to be advanced in a second direction.

18. A system according to claim 17, wherein:

said measuring means is adapted to produce first and second further signals each representing a subpattern of said input pattern;

said first conditioning means is adapted to cause said counter to be advanced only in the presence of said first further signal; and said second conditioning means is adapted to cause said counter to be advanced only in the presence of both said first and said second further signals.

19. In a pattern-recognition system, apparatus for producing a forced segmentation signal for defining a bounded area of an input pattern, said apparatus comprising:

means for scanning data representing an input pattern;

measuring means coupled to said scanning means for producing a plurality of signals indicative of a width of said input pattern;

mode-control means responsive to a first of said width signals for re-entering said input pattern into said measuring means;

accumulating means responsive to said first width signal for storing a representation of said width;

means responsive to said first width signal to increment said accumulating means at a first predetermined rate after re-entry of said pattern; and output gating means responsive to a threshold magnitude in said accumulating means for producing said forced segmentation signal.

20. A system according to claim 19, wherein said scanning means is responsive to said mode-control means for rescanning said input pattern, and wherein said scanning means is adapted to produce a plurality of spaced raster scans over said input pattern, both during its first scanning pattern and during said rescan pattern.

21. A system according to claim 20, further comprising intermediate gating means responsive to a predetermined subpattern of said input pattern for gating said first width signal.

22. A system according to claim 21, wherein:

said measuring means includes a first counter adapted to be strobed during each of said scans, first conditioning means for causing said counter to increment in a first direction, second conditioning means for causing said counter to increment in a second direction, and decoding means responsive to a plurality of threshold magnitudes in said counter for producing said width signals;

said mode-control means includes means for activating said first conditioning means furing at least said first scanning pattern, means responsive to said gated first width signal for activating said second conditioning means, and means responsive to a second of said width signals for deactivating said second conditioning means.

23. A system according to claim 22, wherein said accumulating means includes a second counter, means responsive to said gated first width signal for transferring the contents of said first counter to said second counter, means responsive to said gated first width signal for conditioning said second counter to increment in a specified direction, and means responsive to said gated first width signal for strobing and second counter a first number of times during each of said scans during said rescan.

24. A system according to claim 23, wherein:

said intermediate gating means includes means responsive to said predetermined subpattern for gating a third of said width signals; and said accumulating means includes means responsive to said gated third width signal for strobing said second counter a second number of times during each of said scans during said rescan.

25. A system according to claim 19, further comprising:

means responsive to a plurality of subpatterns of said input pattern for producing a pattern segmentation signal for defining a boundary of said bounded area; and means responsive to said first width signal for inhibiting said pattern segmentation signal.

* * * * *

PO-1050
(5/69)

UNITED STATES PATENT OFFICE
CERTIFICATE OF CORRECTION

Patent No. 3,694,807 Dated September 26, 1972

Inventor(s) Milton F. Bond et al

It is certified that error appears in the above-identified patent and that said Letters Patent are hereby corrected as shown below:

Col. 12, line 16, delete "on" and substitute --one--.

Col. 16, line 26, delete "furing" and substitute --during--.

Signed and sealed this 1st day of May 1973.

(SEAL)
Attest:

EDWARD M. FLETCHER, JR.
Attesting Officer

ROBERT GOTTSCHALK
Commissioner of Patents